United States Patent
Yokosuka et al.

(10) Patent No.: US 9,922,440 B2
(45) Date of Patent: Mar. 20, 2018

(54) ANIMATION DEVICE AND ANIMATION METHOD TO MAKE A SEEMING MOVING DIRECTION AGREE WITH A DETERMINED MOVING DIRECTION OF THE ANIMATION

(71) Applicant: MITSUBISHI ELECTRIC CORPORATION, Tokyo (JP)

(72) Inventors: Yusuke Yokosuka, Tokyo (JP); Kyoichi Masutomi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 15/031,422

(22) PCT Filed: Nov. 8, 2013

(86) PCT No.: PCT/JP2013/080277
§ 371 (c)(1),
(2) Date: Apr. 22, 2016

(87) PCT Pub. No.: WO2015/068271
PCT Pub. Date: May 14, 2015

(65) Prior Publication Data
US 2016/0275713 A1    Sep. 22, 2016

(51) Int. Cl.
*G06T 13/80*    (2011.01)
*G06F 3/0485*    (2013.01)
*G06F 3/0488*    (2013.01)

(52) U.S. Cl.
CPC ............ *G06T 13/80* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2005/0057687 A1 | 3/2005 | Irani et al. | |
| 2011/0010659 A1* | 1/2011 | Kim | G06F 3/0485 |
| | | | 715/784 |
| 2012/0272181 A1* | 10/2012 | Rogers | G06F 3/0482 |
| | | | 715/784 |

FOREIGN PATENT DOCUMENTS

| | | |
|---|---|---|
| CN | 101833391 A | 9/2010 |
| JP | 62-18595 A | 1/1987 |

(Continued)

OTHER PUBLICATIONS

Fukinuki, "Suppression of Wagon-Wheel Effect by Motion-Inducing Signals", IEICE Technical Report, Apr. 20, 2012, vol. 112, No. 20, pp. 19-22.

*Primary Examiner* — Vu Nguyen
(74) *Attorney, Agent, or Firm* — Birch, Stewart, Kolasch & Birch, LLP

(57) ABSTRACT

A moving position correcting section is provided which determines a seeming moving direction of an animation from positional relationships between positions before movement of a plurality of images composing the animation and moving positions of the plurality of images calculated by a moving position calculation section, and if the seeming moving direction disagrees with the moving direction determined by the moving position calculation section, the moving position correcting section corrects the moving positions of the plurality of images in such a manner that the seeming moving direction agrees with the moving direction determined by the moving position calculation section. An image display displays the plurality of images at the moving positions corrected by the moving position correcting section.

9 Claims, 7 Drawing Sheets

(a)

(b)

(56) References Cited

FOREIGN PATENT DOCUMENTS

| JP | 2005-515675 A | 5/2005 |
|---|---|---|
| JP | 2008-148064 A | 6/2008 |
| JP | 2008-188080 A | 8/2008 |
| KR | 10-2011-0099413 A | 9/2011 |

* cited by examiner (a)　　　　　　　　　　　　(b)

ANIMATION DEVICE AND ANIMATION METHOD TO MAKE A SEEMING MOVING DIRECTION AGREE WITH A DETERMINED MOVING DIRECTION OF THE ANIMATION

TECHNICAL FIELD

The present invention relates to an animation device and an animation method for moving an animation in a designated direction.

BACKGROUND ART

In a recent user interface, an expression referred to as a Cover Flow display (Cover Flow is a registered trademark of Apple Inc., the mention of which will be omitted from now on) is used frequently.

Cover Flow has a function of arranging a plurality of images (such as album jacket pictures as to music players, and printed images of first pages as to document files) in a page and displaying them. It can move the images displayed on a page under the operation of a user to switch the images to be displayed, thereby being able to display images that cannot be displayed on a single page.

If a device that displays Cover Flow is a terminal with a touch screen, a user can move a plurality of images by a finger swipe operation referred to as a flick when the user wishes to switch the images to be displayed, for example.

FIG. 13 is a diagram illustrating an example of displaying five images by scrolling in a horizontal direction, in which each square designates an image.

When such a plurality of images constitute an animation, the individual images seems alike. Accordingly, when moving the plurality of images in the right direction, for example, a phenomenon of producing an illusion can sometimes occur that the plurality of images are moving in the left direction.

The phenomenon is called a wagon wheel phenomenon, and a method of preventing the wagon wheel phenomenon is disclosed in the following Patent Documents 1-3.

A Patent Document 1 discloses, to prevent the wagon wheel phenomenon as to the rotation of tires when shooting a vehicle, a method of setting controlled variables (the rotation speed of the tires and the frequency of a camera) so that the tires appear to be rotating in the forward direction according to information about the number of patterns of the tires, the frequency of the camera and a moving state of the vehicle.

This enables a viewer of the animation to perceive that the tires are rotating in the forward direction.

A Patent Document 2 discloses a technique suitable to be applied to a game machine such as a pachinko machine.

More specifically, when displaying patterns imitating reels used for a slot machine on a liquid crystal panel as an object, although the patters are variably displayed to be seen as if real reels were rotating, a problem can sometimes occur in that the patterns appear or disappear while the moving speed of the patterns variably displayed is changed successively. In addition, since the positions that enable reading the patterns move everywhere of a band variably displayed, a problem can sometimes occur of providing visually unpleasant images.

To prevent the foregoing problems, the Patent Document 2 displays the patterns at variable speed that makes them appear to move at a prescribed speed or less or to be stopped according to the relationships between a frame feed speed of the images and the intervals of the patterns. In addition, as for a proper slot machine, although the individual patterns differ, the patterns of the same type are displayed for a fixed interval.

Thus, specific patterns become readable at specific positions, thereby being able to prevent the patterns from becoming readable or unreadable. In addition, it can prevent unpleasant display such as flickering involved in the switching of the patterns.

A Patent Document 3 discloses, in an animation playback engine that displays an animation in a double buffer method, a method of continuously displaying the animation by displaying images in which the previous buffer and the next buffer are superimposed to prevent intermittent movement of the animation due to a stroboscopic effect.

PRIOR ART DOCUMENT

Patent Document

Patent Document 1: Japanese Patent Laid-Open No. 2008-148064 (Paragraph [0006]).

Patent Document 2: Japanese Patent Laid-Open No. 2008-188080 (Paragraph [0008]).

Patent Document 3: Japanese Patent Laid-Open No. 62-18595/1987.

DISCLOSURE OF THE INVENTION

Problems to be Solved by the Invention

With the foregoing configurations, the conventional animation devices have the following problems. When the prevention method of the wagon wheel phenomenon disclosed in the Patent Document 1 is applied, the moving speed of the plurality of images composing the animation is set at the moving speed that can prevent the wagon wheel phenomenon. Accordingly, the plurality of images are moved at a moving speed different from the moving speed conforming with an operation state of a user, offering a problem of impairing the operation feeling of the user.

In addition, when the prevention method of the wagon wheel phenomenon disclosed in the Patent Document 2 is applied, even if a user makes a quick operation, a plurality of images are displayed at variable speed that makes them appear to be moved at the prescribed speed or less or to be stopped, which also offers a problem of impairing the operation feeling of the user.

In addition, when the prevention method of the wagon wheel phenomenon disclosed in the Patent Document 3 is applied, if an interframe speed is too high, a problem occurs that the wagon wheel phenomenon occurs.

The present invention is implemented to solve the foregoing problems. Therefore it is an object of the present invention to provide an animation device and an animation method capable of achieving animation display fitting with the bodily sensation of a user operation without bringing about a wagon wheel phenomenon.

Means for Solving the Problems

An animation device in accordance with the present invention is configured in such a manner that it comprises: a moving operation acceptor to accept a moving operation of an animation; a moving position calculator to determine a moving distance and a moving direction of a plurality of images composing the animation from the moving operation received by the moving operation acceptor, and to calculate moving positions of the plurality of images composing the animation from the moving distance and the moving direction; and a moving position corrector to correct the moving positions of the plurality of images in a manner that a seeming moving direction of the animation agrees with the moving direction determined by the moving position calculator, wherein an image display displays the plurality of images at the moving positions corrected by the moving position corrector.

Advantages of the Invention

According to the present invention, since it is configured in such a manner that it comprises the moving position corrector to correct the moving positions of the plurality of images composing the animation in a manner that the seeming moving direction of the animation agrees with the moving direction determined by the moving position calculator, and the image display displays the plurality of images at the moving positions corrected by the moving position corrector. Accordingly, it offers an advantage of being able to achieve the animation display fitting with the bodily sensation of a user operation without bringing about a wagon wheel phenomenon.

BEST MODE FOR CARRYING OUT THE INVENTION

The best mode for carrying out the invention will now be described with reference to the accompanying drawings to explain the present invention in more detail.

Embodiment 1

Figure 1:
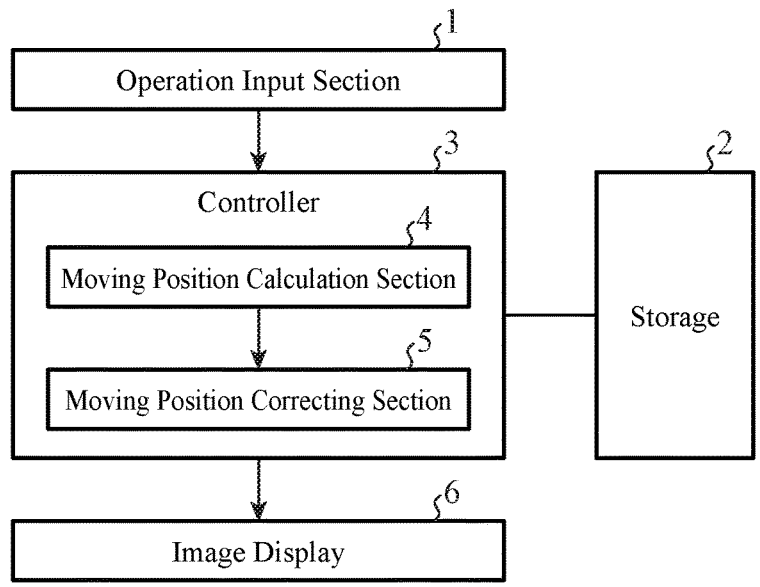
FIG. 1 is a block diagram showing a configuration of an animation device of an embodiment 1 in accordance with the present invention.

FIG. 1 is a block diagram showing a configuration of an animation device of an embodiment 1 in accordance with the present invention.

In FIG. 1, an operation input section 1 is comprised of a device that enables an input operation, such as a mouse, keyboard or touch screen, and executes the processing of accepting a moving operation of an animation by a user.

For example, when the operation input section 1 is comprised of a keyboard, it accepts input designating the direction of an operation such as a left arrow key or right arrow key. In addition, when the operation input section 1 is comprised of a touch screen, it accepts a finger swipe operation such as a flick.

When the operation input section 1 accepts a moving operation of an animation by a user, it outputs the contents of the moving operation to a controller 3. Incidentally, the operation input section 1 constitutes a moving operation accepting unit.

A storage 2, which is comprised of a RAM or a hard disk, for example, stores image data of a plurality of images composing an animation.

For example, when the animation device of FIG. 1 is mounted on a music player, the storage 2 not only stores data on a plurality of album jacket pictures as image data, but also stores music file data (including information such as the title and the name of a player of a piece) and the like.

In addition, when the animation device of FIG. 1 is mounted in a device comprising a browser, the storage 2 stores printed images of first pages of a plurality of document files as the image data.

The controller 3, which is comprised of a semiconductor integrated circuit with a CPU mounted therein, or of a single-chip microcomputer, for example, comprises a moving position calculation section 4 and a moving position correcting section 5.

The moving position calculation section 4 of the controller 3 executes the processing of determining the moving distance and moving direction of a plurality of images composing the animation from the moving operation accepted by the operation input section 1, and of calculating moving positions of the plurality of images composing the animation from the moving distance and moving direction. Incidentally, the moving position calculation section 4 constitutes a moving position calculation unit.

The moving position correcting section 5 of the controller 3 determines a seeming moving direction of the animation from the positional relationships between the positions before movement of the plurality of images composing the animation and the moving positions of the plurality of images calculated by the moving position calculation section 4, and executes the processing of deciding whether the seeming moving direction agrees with the moving direction determined by the moving position calculation section 4.

More specifically, the moving position correcting section 5 determines the image moving positions where a wagon wheel phenomenon occurs from the positions before movement of the plurality of images composing the animation, and if the moving positions of the plurality of images calculated by the moving position calculation section 4 are present at the image moving positions where a wagon wheel phenomenon occurs, the moving position correcting section 5 decides that the seeming moving direction of the animation disagrees with the moving direction determined by the moving position calculation section 4, but if the moving positions of the plurality of images calculated by the moving position calculation section 4 are not present at the image moving positions where a wagon wheel phenomenon occurs, it decides that the seeming moving direction of the animation agrees with the moving direction determined by the moving position calculation section 4.

In addition, if the moving position correcting section 5 decides that the seeming moving direction of the animation does not agree with the moving direction determined by the moving position calculation section 4, it executes the processing of correcting the moving positions of the plurality of images composing the animation so that they agree with the moving direction determined by the moving position calculation section 4. Incidentally, the moving position correcting section 5 constitutes a moving position correcting unit.

The image display 6, which is comprised of a GPU (Graphics Processing Unit) and a liquid-crystal display, for example, acquires the image data of a plurality of images composing the animation from the storage 2. If the moving position correcting section 5 decides that the seeming moving direction of the animation agrees with the moving direction determined by the moving position calculation section 4, the image display 6 displays the plurality of images at the moving positions calculated by the moving position calculation section 4; but if the moving position correcting section 5 decides that the seeming moving direction of the animation does not agree with the moving direction determined by the moving position calculation section 4, the image display 6 executes the processing of displaying the plurality of images at the moving positions corrected by the moving position correcting section 5. Incidentally, the image display 6 constitutes an image display unit.

Although the example of FIG. 1 supposes that the operation input section 1, storage 2, controller 3 and image display 6, which are components of the animation device are each composed of a dedicated hardware device, the animation device can be comprised of a computer.

When the animation device is comprised of a computer, a configuration is possible in which the storage 2 is comprised of a memory of the computer, and programs describing the processing contents of the operation input section 1, controller 3 and image display 6 are stored in the computer memory so that the CPU of the computer executes the programs stored in the memory.

Figure 2:
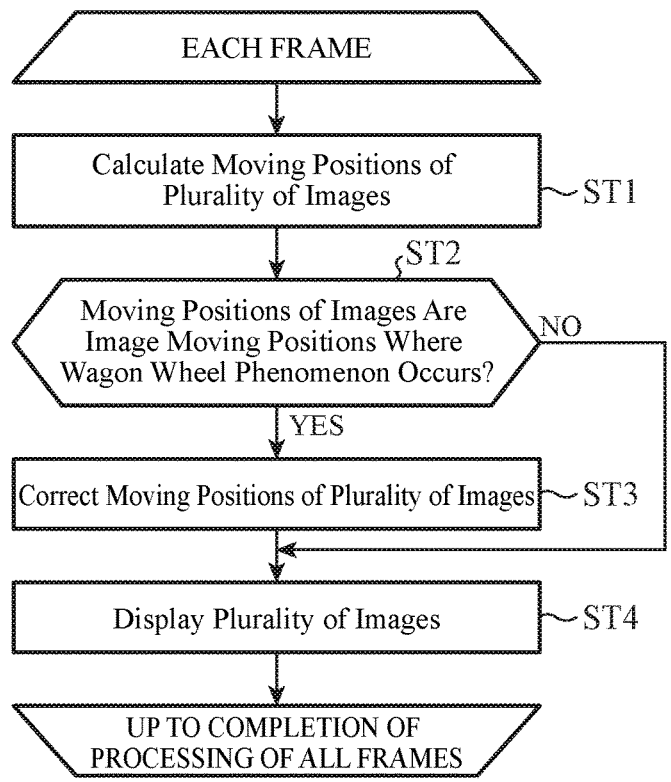
FIG. 2 is a flowchart showing processing contents (an animation method) of the animation device of the embodiment 1 in accordance with the present invention.

FIG. 2 is a flowchart showing the processing contents (animation method) of the animation device of the embodiment 1 in accordance with the present invention.

Next, the operation will be described.

Figure 3:
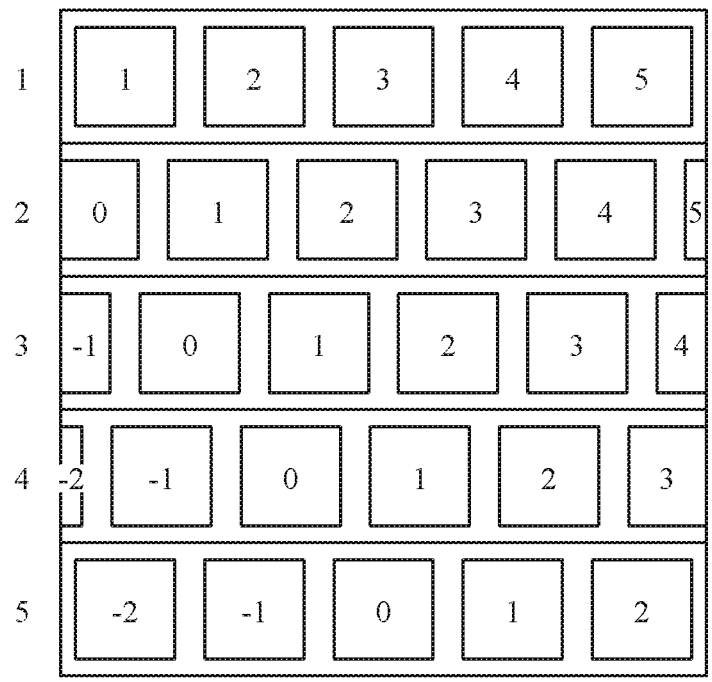
FIG. 3 is a diagram illustrating a display example of a plurality of images composing the animation.

FIG. 3 is a diagram illustrating a display example of a plurality of images composing the animation.

Figure 13:
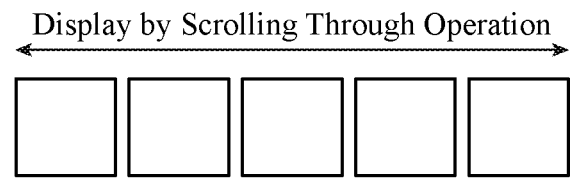
FIG. 13 is a diagram illustrating an example that displays five images by scrolling them in a horizontal direction.

In FIG. 3, the frame number 1 is an image group displayed on the image display 6 now, and images with image numbers 1-5 are being displayed. Incidentally, the arrangement of the individual images in the frame are the same as the arrangement of the individual images in FIG. 13.

In the present embodiment 1, an example will be described in which a user flicks the images to move them in the right direction in FIG. 3 while the image group with the frame number 1 is being displayed.

When the user flicks the images to move them in the right direction (moving operation of the animation) while the image group with the frame number 1 is being displayed, the operation input section 1 detects the flick, and gives information about the contents of the flick to the moving position calculation section 4 of the controller 3.

As the contents of the flick, it is conceivable that there are a trace speed (such as initial speed) of a finger of the user with respect to the touch screen, a trace amount (length of trace), and a trace direction (moving direction of the images), for example.

Incidentally, as for the detecting processing of the flick through the operation input section 1 and informing processing about the contents of the flick, since they are a publicly known technique, their detailed description will be omitted here.

When the information about the contents of the flick is given from the operation input section 1, the moving position calculation section 4 of the controller 3 determines from the contents of the flick the moving distance of the individual frames from the start to the end of the animation.

For example, when the time interval for updating the display frame is fixed, and if the trace speed of the finger of the user is high, the moving position calculation section 4 increases the interframe moving distance so that the individual images appear to move fast.

On the other hand, if the trace speed of the finger of the user is slow, it reduces the interframe moving distance so that the individual images appear to move slowly.

After determining the moving distance of the individual frames from the start to the end of the animation, the moving position calculation section 4 computes the moving distance L of the plurality of images composing the animation by using the moving distance of the individual frames from the start to the end, the trace speed (such as the initial speed) of the finger, the trace amount (length of trace) of the finger and the like as the parameters of a publicly known easing function or the like, and by calculating the easing function or the like.

Basically, the moving distance L of the images is proportional to the trace speed and trace amount of the finger.

After determining the moving distance L and moving direction $\theta$ of the plurality of images composing the animation, the moving position calculation section 4 computes for each frame the moving positions of the plurality of images composing the animation from the moving distance L and moving direction $\theta$ (step ST1 of FIG. 2).

Figure 4:
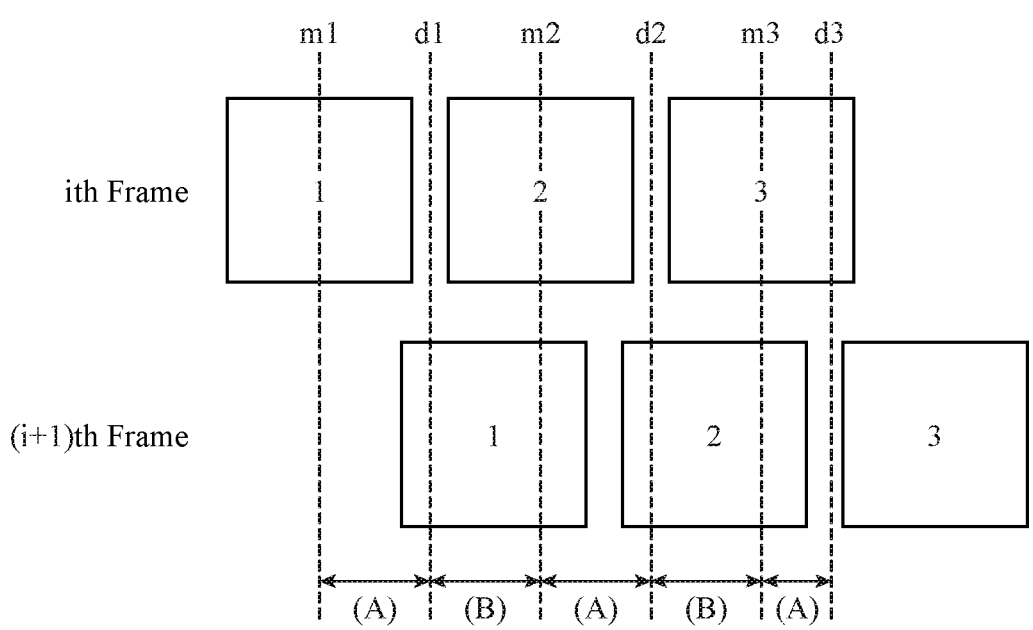
FIG. 4 is a diagram illustrating an example of moving positions of the plurality of images calculated by the moving position calculation section 4.

FIG. 4 is a diagram illustrating an example of the moving positions of the plurality of images calculated by the moving position calculation section 4.

In FIG. 4, the ith frame is a frame displayed now on the image display 6 (corresponding to the frame with the frame number 1 in the example of FIG. 3); and the (i+1)th frame is a frame to be displayed next on the image display 6 (corresponding to the frame with the frame number 2 in the example of FIG. 3).

In FIG. 4, however, for the sake of simplicity of the drawing, the number of the images constituting the animation is made three, which is less than the number of the images displayed in FIG. 3.

After the moving position calculation section 4 computes the moving positions of the plurality of images composing the animation, the moving position correcting section 5 of the controller 3 determines for each frame the seeming moving direction of the animation from the positional relationships between the positions of the plurality of images before movement (positions of the images in the ith frame in FIG. 4) and the moving positions of the plurality of images calculated by the moving position calculation section 4 (positions of the images in the (i+1)th frame in FIG. 4).

As described above, a wagon wheel phenomenon can occur depending on the moving positions of the plurality of images. Unless the wagon wheel phenomenon occurs, the seeming moving direction of the animation agrees with the real moving direction θ (right direction in the present example). However, if the wagon wheel phenomenon occurs, the seeming moving direction of the animation becomes opposite (left direction in the present example) to the real moving direction θ (right direction in the present example).

Here, the determining processing of the seeming moving direction of the animation by the moving position correcting section 5 will be described using a concrete example.

First, the moving position correcting section 5 determines the image moving position where a wagon wheel phenomenon occurs from the positions of the plurality of images composing the animation before movement.

For example, as shown in FIG. 4, perpendiculars m1, m2 and m3 are drawn which pass through the center of the individual images before movement, and perpendicular bisectors d1 and d2 are drawn which pass through the center between the individual images before movement.

In this case, for example, the wagon wheel phenomenon does not occur when the perpendicular m1 (or m2) is placed on the left side of the centers of the individual images after movement, and when the perpendicular bisector d1 (or d2) is placed on the right side of them (in FIG. 4, when the centers of the individual images after movement belong to areas (A)).

However, the wagon wheel phenomenon occurs when the perpendicular bisector d1 (or d2) is placed on the left side of the centers of the individual images after movement, and when the perpendicular m2 (or m3) is placed on the right side of them (in FIG. 4, when the centers of the individual images after movement belong to areas (B)).

Accordingly, the wagon wheel phenomenon occurs when the moving positions of the plurality of images are at the moving positions as shown in FIG. 4. However, when the moving positions of the plurality of images are at the positions where the wagon wheel phenomenon does not occur, the moving position correcting section 5 decides that the seeming moving direction of the animation is forward, and agrees with the real moving direction θ (the right direction in the present example).

On the other hand, when the moving positions of the plurality of images are at positions where the wagon wheel phenomenon occurs, the moving position correcting section 5 decides that the seeming moving direction of the animation is reverse, and does not agree with the real moving direction θ (the right direction in the present example).

When the moving position correcting section 5 decides that the moving positions of the plurality of images are at positions where the wagon wheel phenomenon does not occur, and the seeming moving direction is forward (step ST2), it informs the image display 6 of the decision result that the seeming moving direction is forward.

When the moving position correcting section 5 decides that the moving positions of the plurality of images are at positions where the wagon wheel phenomenon occurs, and the seeming moving direction is reverse (step ST2), it corrects the moving positions of the plurality of images composing the animation in such a manner that the seeming moving direction of the animation agrees with the real moving direction θ (the right direction in the present example) (step ST3), and informs the image display 6 of the decision result that the seeming moving direction is reverse.

Figure 5:
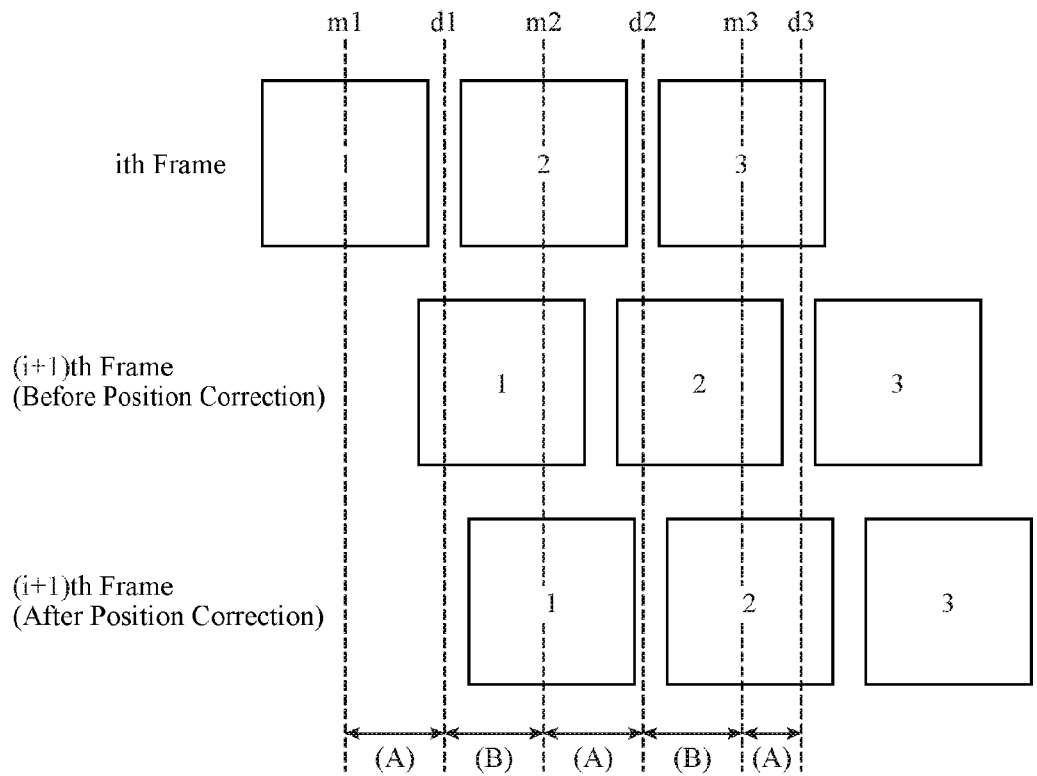
FIG. 5 is a diagram illustrating a correction example of the moving positions of the plurality of images by the moving position correcting section 5.

FIG. 5 is a diagram illustrating a correction example of the moving positions of the plurality of images by the moving position correcting section 5.

In FIG. 5, since the moving positions of the plurality of images in the (i+1)th frame calculated by the moving position calculation section 4 are moving positions where the wagon wheel phenomenon occurs, the moving position correcting section 5 corrects the moving positions of the plurality of images in the (i+1)th frame.

In the case where the moving position correcting section 5 corrects the moving positions of the plurality of images, two correcting modes are conceivable: a correcting mode in which the plurality of images are shifted toward the right so as to be placed at moving positions where the wagon wheel phenomenon does not occur (moving positions where the center positions of the individual images belong to the areas (A)); and a correcting mode in which the plurality of images are shifted toward the left so as to be placed at moving positions where the wagon wheel phenomenon does not occur (moving positions where the center positions of the individual images belong to the areas (A)).

As for the example of FIG. 5, it is conceivable as the correction positions, for example, the positions where the centers of the individual images after movement are placed between the perpendicular m1 and the perpendicular bisector d1 (the positions shifted toward the left by about one-third of the image width); the positions where they are placed between the perpendicular m2 and the perpendicular bisector d2 (the positions shifted toward the right by a quarter of the image width); and the positions where they are placed between the perpendicular m3 and the perpendicular d3 (the positions shifted toward the right by one and a half of the image width).

Among the conceivable correction positions, the positions where the centers of the individual images after movement are placed between the perpendicular m2 and the perpendicular bisector d2 (positions shifted toward the right by a quarter of the image width) are the closest to the moving positions calculated by the moving position calculation section 4. Thus, in the example of FIG. 5, the moving position correcting section 5 decides the positions placed between the perpendicular m2 and the perpendicular bisector d2 (positions shifted toward the right by a quarter of the image width) as the moving positions after correction of the images.

When the decision result given by the moving position correcting section 5 indicates that the seeming moving direction is forward, the image display 6 displays the plurality of images at the moving positions calculated by the moving position calculation section 4 (step ST4).

When the decision result given by the moving position correcting section 5 indicates that the seeming moving direction is reverse, the image display 6 displays the plurality of images at the moving positions corrected by the moving position correcting section 5 (step ST4).

Figure 6:
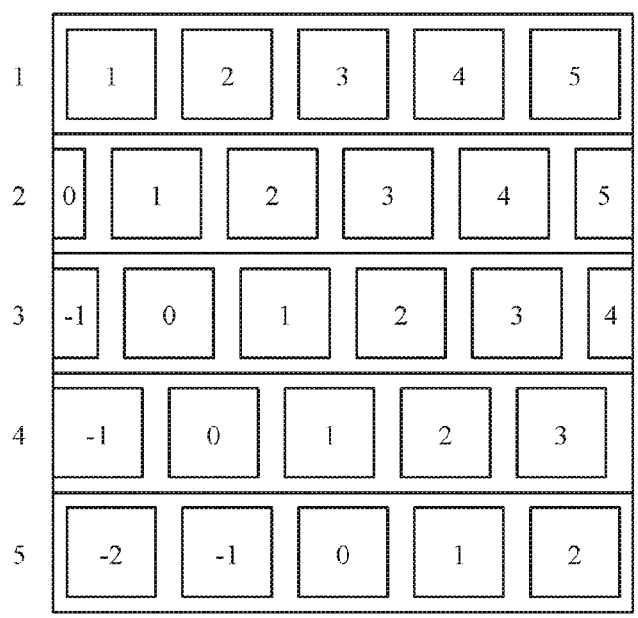
FIG. 6 is a diagram illustrating a display example of a plurality of images composing an animation by the image display 6.

FIG. 6 is a diagram illustrating a display example of a plurality of images constituting the animation by the image display 6.

When the display of the plurality of images in the individual frames varies as shown in FIG. 6, the wagon wheel phenomenon does not occur, and the seeming moving direction of the animation agrees with the real moving direction θ (the right direction in the present example).

As is clear from the above, according to the present embodiment 1, it is configured in such a manner that it comprises the moving position correcting unit 5 which determines the seeming moving direction of the animation from the positional relationships between the positions before movement of the plurality of images composing the animation and the moving positions of the plurality of images calculated by the moving position calculation unit 4, and that unless the seeming moving direction agrees with the moving direction determined by the moving position calculation unit 4, the moving position correcting unit 5 corrects the moving positions of the plurality of images so that the seeming moving direction agrees with the moving direction determined by the moving position calculation unit 5, and the image display unit 6 displays the plurality of images at the moving positions corrected by the moving position correcting unit 5. Accordingly, it offers an advantage of being able to prevent a wagon wheel phenomenon from occurring, and to realize the animation display conforming with the bodily sensation of the user operation.

In addition, since the present embodiment 1 is configured in such a manner as to correct the moving positions of the plurality of images calculated by the moving position calculation section 4 to the positions where the wagon wheel phenomenon does not occur without changing the frame rate of the animation, it can complete the processing of the animation in a time period corresponding to the operation feeling of the user.

Incidentally, the loop of FIG. 2 is a loop referring to the processing of each frame, and the animation processing completes when the processing of all the frames terminates. As for the processing within the loop, it is not executed immediately, but is executed correspondingly to the animation display period.

Although the present embodiment 1 shows an example in which the plurality of images composing the animation are arranged in the horizontal direction, the direction in which the plurality of images are arranged is not limited to the horizontal direction.

Figure 7:
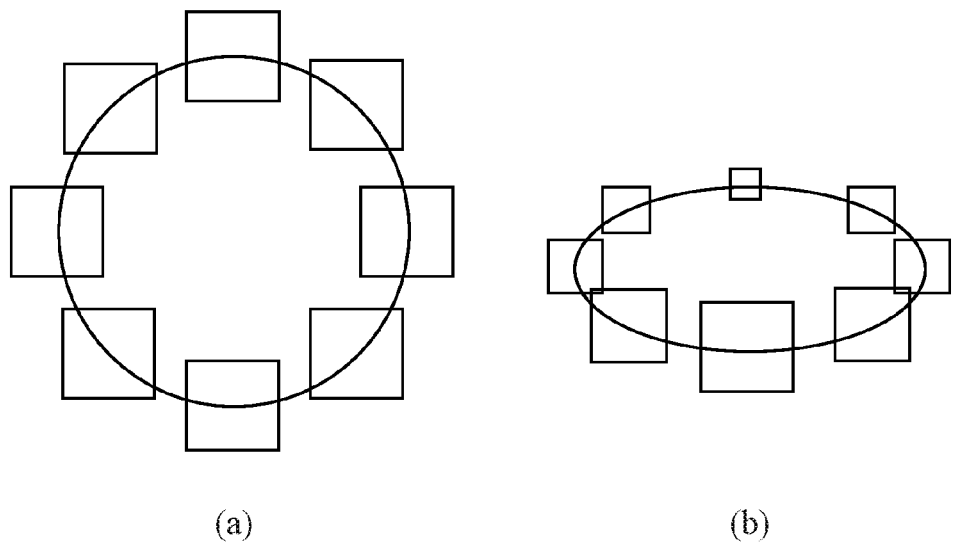
FIG. 7(*a*) is a diagram illustrating an example in which a plurality of images composing the animation are arranged on a circle, and FIG. 7(*b*) is a diagram illustrating an example in which a plurality of images are arranged on a circle when looking at the plurality of images three-dimensionally from above.

For example, FIG. 7(*a*) shows an example in which a plurality of images composing an animation are arranged in a circle; and FIG. 7(*b*) shows an example in which when a plurality of images are seen three-dimensionally from the above, the plurality of images are arranged in a circle.

For example, when a plurality of images are arranged in a circle, the moving direction of the plurality of images is along the circle, and the moving distance of the plurality of images is the distance along the circle.

Although the present embodiment 1 shows an example in which the moving position correcting section 5 decides that the wagon wheel phenomenon does not occur when the perpendicular m1 (or m2 or m3) is placed on the left side of the centers of the individual images after movement, and when the perpendicular bisector d1 (or d2) is placed on the right side of them (in FIG. 4, when the centers of the individual images after movement belong to the areas (A)), the wagon wheel phenomenon can sometimes occur owing to an optical illusion even if they belong to the areas (A) when the animation is moved at a high speed.

In such a case, it is possible to divide the space between the two adjacent images into 1:3, for example, and to decide that no wagon wheel phenomenon occurs if the centers of the individual images after movement belong to the areas of "1", and that a wagon wheel phenomenon occurs if the centers of the individual images after movement belong to the areas of "3".

Embodiment 2

The foregoing embodiment 1 shows an example in which the moving position correcting unit 5 determines the image moving positions where a wagon wheel phenomenon occurs from the positions before movement of the plurality of images composing the animation, and if the moving positions of the plurality of images calculated by the moving position calculation unit 4 are present at the image moving positions where the wagon wheel phenomenon occurs, the moving position correcting unit 5 decides that the seeming moving direction of the animation disagrees with the moving direction determined by the moving position calculation unit 4.

In the present embodiment 2, however, the moving position correcting section 5 decides that the seeming moving direction of the animation agrees with the moving direction determined by the moving position calculation section 4 when the moving distance L of a plurality of images composing the animation is less than a predetermined reference distance $L_{ref}$, even if the moving positions of the plurality of images calculated by the moving position calculation section 4 is in the image moving positions where a wagon wheel phenomenon occurs.

Figure 8:
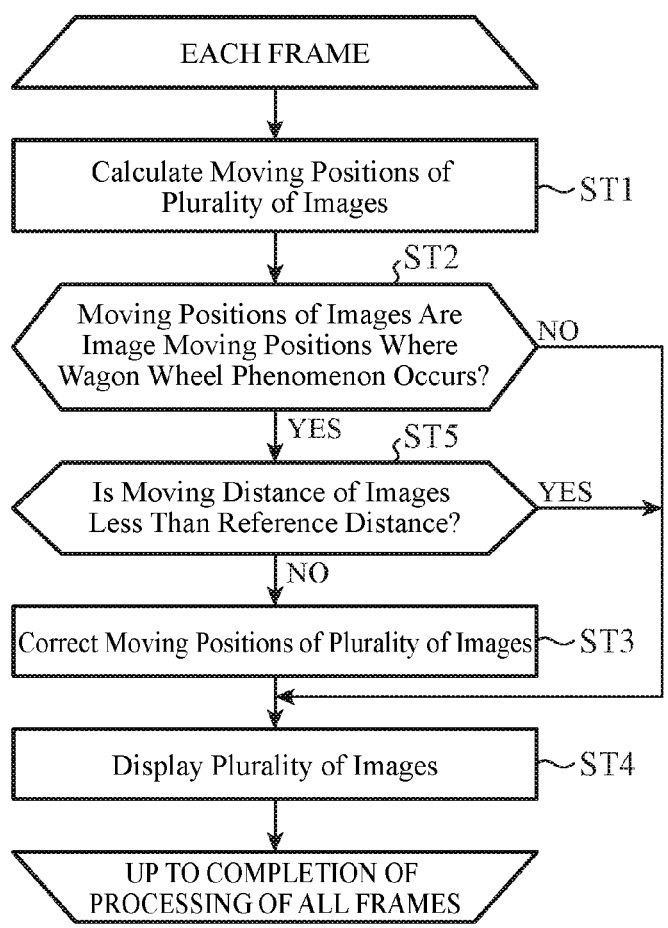
FIG. 8 is a flowchart showing processing contents (an animation method) of an animation device of an embodiment 2 in accordance with the present invention.

FIG. 8 is a flowchart showing the processing contents (animation method) of the animation device of the embodiment 2 in accordance with the present invention.

For example, as for the animation to which easing is added, it frequently occurs that although the amount of movement is large in frames at an initial stage of the animation, it reduces considerably in frames at a final stage.

When the amount of movement of the frames reduces in this way, even if a decision is made that the moving positions of the plurality of images are in the image moving position where a wagon wheel phenomenon occurs (in the example of FIG. 4, the positions of the centers of the individual images after movement belong to the areas (B)), the seeming moving direction of the animation appears to be forward.

Thus, in the present embodiment 2, the moving position correcting section 5 is configured in such a manner that it compares the moving distance L of the plurality of images composing the animation with the predetermined reference distance $L_{ref}$ (threshold) as shown in FIG. 8, and that if the moving distance L of the plurality of images is less the reference distance $L_{ref}$ ($L<L_{ref}$), it decides that the seeming moving direction of the animation agrees with the moving direction determined by the moving position calculation section 4 (step ST5) even if it decides at step ST2 that the moving positions of the plurality of images are at positions where the wagon wheel phenomenon occurs and hence the seeming moving direction is reverse.

Accordingly, the moving position correcting section 5 corrects the moving positions of the plurality of images calculated by the moving position calculation section 4 only when the moving positions of the plurality of images are at positions where the wagon wheel phenomenon occurs and when the moving distance L of the plurality of images is greater than the reference distance $L_{ref}$ ($L>L_{ref}$).

Incidentally, in the foregoing embodiment 1, if the seeming moving direction of the animation does not agree with the moving direction determined by the moving position calculation section 4, the moving position correcting section 5 determines as the moving positions after the correction of the plurality of images, the closest position from the moving positions calculated by the moving position calculation section 4 (in the example of FIG. 5, the positions shifted toward the right about a quarter of the width of the images) among the positions whose seeming moving direction agrees with the moving direction determined by the moving position calculation section 4. In the present embodiment 2, however, the moving position correcting unit 5 determines as the moving positions after the correction of the plurality of images, the closest position from the moving positions calculated by the moving position calculation unit 4 among the positions which are present in the predetermined direction (for example, in the real moving direction) selected from among the positions whose seeming moving direction agrees with the moving direction determined by the moving position calculation unit 4.

For example, when the predetermined direction is the right direction, the present embodiment 2 excludes, from a candidate of the correction positions, the positions which are a correction position candidate in the foregoing embodiment 1 such as the positions shifted toward the left about one-third of the width of the images so that the centers of the individual images after movement are placed between the perpendicular m1 and the perpendicular bisector d1, and determines the positions shifted toward the right about a quarter of the width of the images as the correction positions.

On the other hand, when the predetermined direction is the left direction, the present embodiment 2 excludes, from a candidate of the correction positions, the positions which are a correction position candidate in the foregoing embodiment 1 such as the positions shifted toward the right about a quarter of the width of the images so that the centers of the individual images after movement are placed between the perpendicular m2 and the perpendicular bisector d2, and determines the positions shifted toward the left about one-third of the width of the images as the correction positions.

As for the animation as shown in FIG. 3, even if the present processing is executed, it cannot be simplified so much. However, as for an animation in which a plurality of images move on a complex curve designated by a Bezier curve, for example, employing a method such as the present processing that moves a plurality of images in a predetermined direction can reduce the amount of calculation.

Incidentally, since the correction positions are determined uniquely, the correction positions can be stored in the storage 2 in advance.

Embodiment 3

In the foregoing embodiments 1 and 2, if the seeming moving direction of the animation does not agree with the real moving direction, the moving position correcting section 5 corrects the moving positions of the plurality of images composing the animation so that they agree with the real moving direction. However, there are some cases that the moving positions of the interframe images have variations. If the moving positions of the interframe images have variations, the moving speed of the images appears to be fast or slow depending on the frames, which makes it difficult to show smooth animation.

In the example of FIG. 6, although the moving distance of the individual images is about half the image width in the transition from the frame number 1 to the frame number 2, the moving distance of the individual images in the transition from the frame number 2 to the frame number 3 is about one and a half the image width, thus bringing about variations in the moving positions of the interframe images.

In the present embodiment 3, a contrivance is made to reduce the variation in the moving positions of the interframe images.

Figure 9:
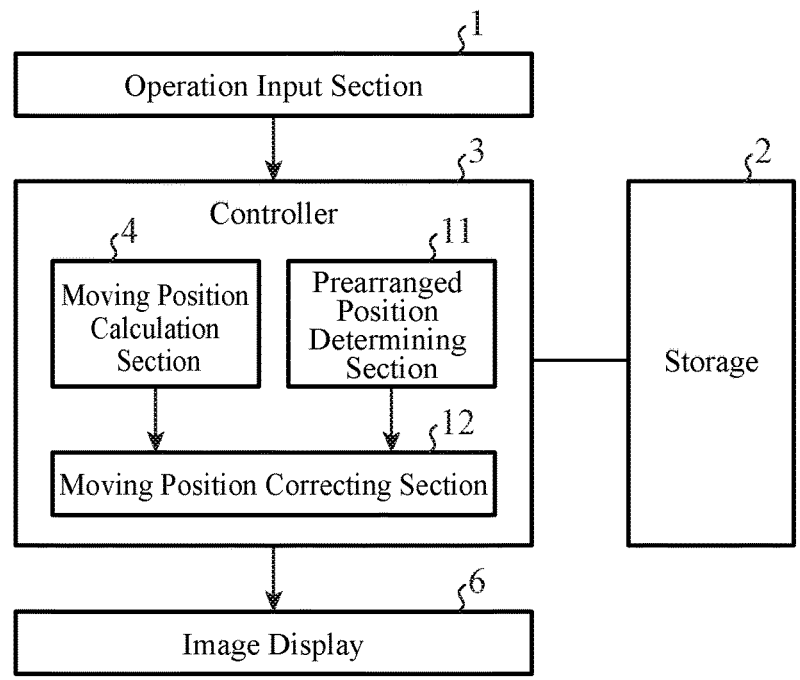
FIG. 9 is a block diagram showing a configuration of an animation device of an embodiment 3 in accordance with the present invention.

FIG. 9 is a block diagram showing a configuration of an animation device of the embodiment 3 in accordance with the present invention. In FIG. 9, since the same reference numerals as those of FIG. 1 designate the same or like components, their description will be omitted.

A prearranged position determining section 11 executes the processing of determining for each frame the prearranged positions which are the arrangement of the plurality of images when the arrangement of the plurality of images displayed in the initial frame in an animation is moved to the next images in the final frame in the animation. Incidentally, the prearranged position determining section 11 constitutes a prearranged position determining unit.

Since a wagon wheel phenomenon does not occur in an animation in which the images move to the next images, a moving position correcting section 12 differs from the moving position correcting section 5 of FIG. 1 in that it does not execute the processing of determining the seeming moving direction of the animation, but executes the processing of correcting the moving positions of the plurality of images composing the animation.

More specifically, the moving position correcting section 12 executes the processing of comparing the prearranged positions of the plurality of images determined for each frame by the prearranged position determining section 11 with the moving positions of the plurality of images calculated for each frame by the moving position calculation section 4; of determining for each image constituting the animation the closest prearranged position from the moving position of the image; and of determining the closest prearranged position as the moving position after correction of the image. Incidentally, the moving position correcting section 12 constitutes a moving position correcting unit.

Next, the operation will be described.

When the prearranged position determining section 11 of the controller 3 is informed of the contents of the flick from the operation input section 1, it determines the number of frames from the start to the end of the animation from the contents of the flick in the same manner as the moving position calculation section 4.

Once the prearranged position determining section 11 has determined the number of frames of the animation from the start to the end, it determines for each frame the prearranged positions which are the arrangement of the plurality of images in the case where the arrangement of the plurality of images displayed in the initial frame in the animation is shifted to the next images in the final frame in the animation.

Figure 10:
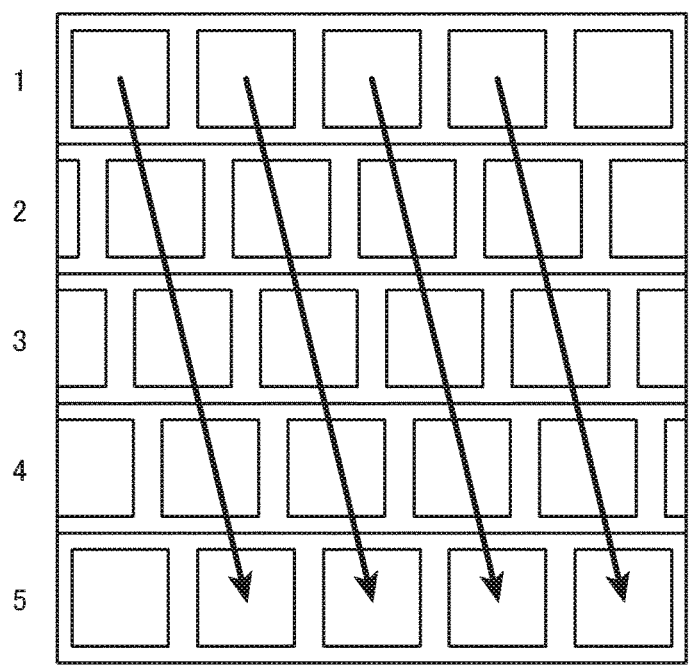
FIG. 10 is a diagram illustrating prearranged positions when the number of frames is five.

FIG. 10 is a diagram illustrating the prearranged positions when the number of frames is five.

In FIG. 10, for example, although the image with the image number 1 in the frame with the frame number 1 (initial frame) is displayed at the extreme left in FIG. 10, it is moved to the second from the left (moved to the next image) in the frame with the frame number 5 (final frame).

The moving position calculation section 4 of the controller 3 determines the number of frames from the start to the end of the animation as in the foregoing embodiment 1, and calculates the moving distance L of the plurality of images composing the animation for each frame up to the final frames.

As for the example of FIG. 10, it calculates the moving distance L of the plurality of images of each frame from the frame number 2 to the frame number 5.

The moving position correcting section 12 of the controller 3 compares the prearranged positions of the plurality of images determined for each frame by the prearranged position determining section 11 with the moving positions of the plurality of images calculated for each frame by the moving position calculation section 4.

Comparing the prearranged positions of the plurality of images with the moving positions of the plurality of images for each frame, the moving position correcting section 12 determines for each image the closest prearranged position from the moving position of the image, and determines the prearranged position as the moving position after correction of the image.

Figure 11:
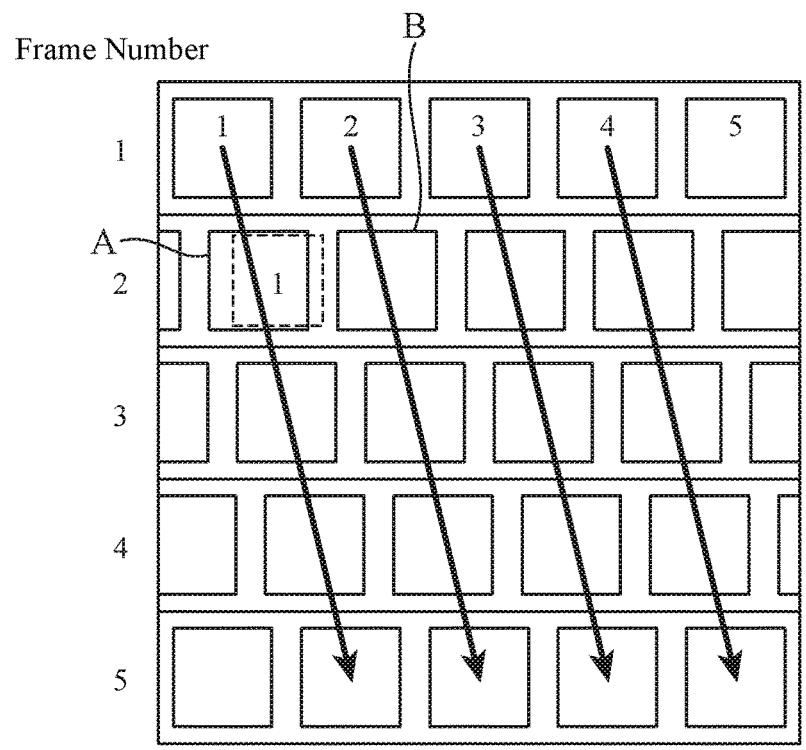
FIG. 11 is a diagram illustrating determining processing of the moving positions of the images after correction by the moving position correcting section 12.

Here, FIG. 11 is a diagram illustrating the determining processing of the moving positions after correction of the images by the moving position correcting section 12.

Figure 12:
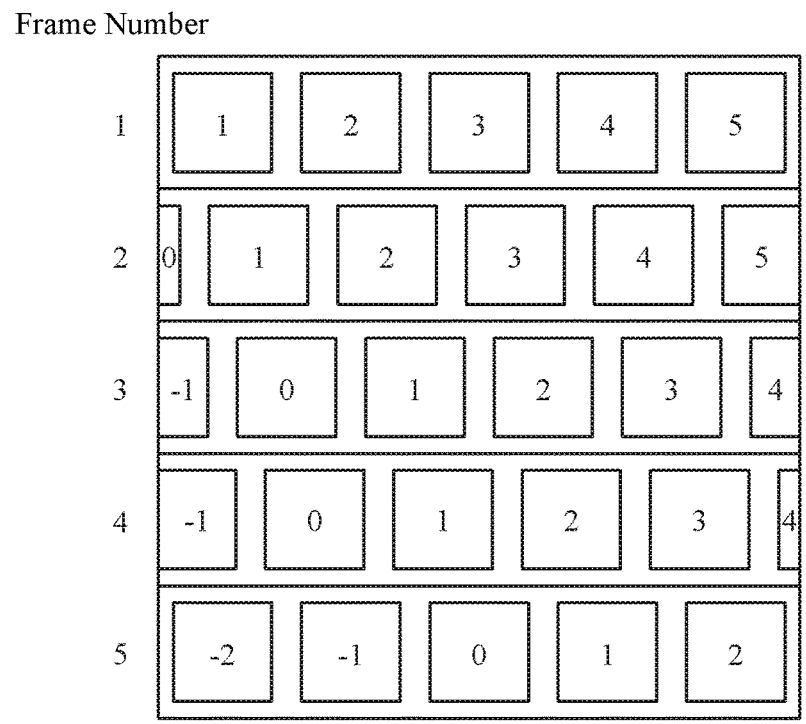
FIG. 12 is a diagram illustrating the moving positions of the plurality of images after correction determined by the moving position correcting section 12.

FIG. 12 is a diagram illustrating the moving positions after correction of the plurality of images determined by the moving position correcting section 12.

For example, as the moving position of the image with the image number 1 in the frame with the frame number 1, the moving position designated by broken lines in the frame with the frame number 2 is calculated by the moving position calculation section 4.

In this case, although the position designated by broken lines (the moving position calculated by the moving position calculation section 4) is adjacent to both the prearranged position designated by a reference symbol A and the prearranged position designated by a reference symbol B, since the closest prearranged position to the position designated by the broken lines is the prearranged position designated by the reference symbol A, the prearranged position designated by the reference symbol A is determined as the moving position after correction of the image with the image number 1 as shown in FIG. 12.

Thus, the moving positions after correction of the images in the individual frames are determined in the same manner as described above.

When the moving position correcting section 12 determines the moving positions after correction of the images in the individual frames, the image display 6 displays the images at the moving positions.

As is clear from the above, according to the present embodiment 3, it is configured in such a manner that it further comprises the prearranged position determining section 11 to determine, for each frame, the prearranged positions which are the arrangement of the plurality of images in the case where the arrangement of the plurality of images displayed in the initial frame of the animation are shifted to the next images in the final frame in the animation, and that the moving position correcting section 12 compares the prearranged positions of the plurality of images determined for each frame by the prearranged position determining section 11 with the moving positions of the plurality of images calculated for each frame by the moving position calculation section 4, determines the closest prearranged position from the image moving position for each image composing the animation, and determines the prearranged position as the moving position after correction of the image. Accordingly, the present embodiment 3 not only offers an advantage of being able to realize the animation display conforming with the bodily sensation of a user operation without bringing about a wagon wheel phenomenon as the foregoing embodiment 1, but also offers an advantage of being able to suppress the variations of the moving positions of the interframe images.

Incidentally, it is to be understood that a free combination of the individual embodiments, variations of any components of the individual embodiments or removal of any components of the individual embodiments is possible within the scope of the present invention.

INDUSTRIAL APPLICABILITY

The present invention is suitable for applications that must carry out animation display that accords with the bodily sensation of a user operation without bringing about a wagon wheel phenomenon when moving the animation in a designated direction.

DESCRIPTION OF REFERENCE SYMBOLS

1 operation input section (moving operation accepting unit); 2 storage; 3 controller; 4 moving position calculation section (moving position calculation unit); 5 moving position correcting section (moving position correcting unit); 6 image display (image display unit); 11 prearranged position determining section (prearranged position determining unit); 12 moving position correcting section (moving position correcting unit).

What is claimed is:

1. An animation device comprising:
    a moving operation acceptor to accept a moving operation of an animation in a moving direction, the animation being composed of a plurality of images movable in the moving direction;
    a moving position calculator to determine a moving distance and the moving direction of the plurality of images composing the animation from the moving operation received by the moving operation acceptor, and to calculate moving positions of the plurality of images composing the animation from the moving distance and the moving direction;
    a moving position corrector to
        determine, based on the calculated moving positions, occurrence of a wagon wheel phenomenon in which a seeming moving direction of the animation disagrees with the determined moving direction, and
        when the wagon wheel phenomenon is determined to occur, correct the calculated moving positions of the plurality of images in a manner that the seeming moving direction of the animation agrees with the moving direction determined by the moving position calculator; and
    an image display to display the plurality of images at the moving positions corrected by the moving position corrector.

2. The animation device according to claim 1, wherein the moving position corrector determines the seeming moving direction of the animation from positional relationships between positions before movement of the plurality of images composing the animation and moving positions of the plurality of images calculated by the moving position calculator, and unless the seeming moving direction agrees with the moving direction determined by the moving position calculator, the moving position corrector corrects the moving positions of the plurality of images so that the seeming moving direction agrees with the moving direction determined by the moving position calculator.

3. The animation device according to claim 2, wherein the moving position corrector determines image moving positions where the wagon wheel phenomenon occurs from the positions before movement of the plurality of images composing the animation, and if the moving positions of the plurality of images calculated by the moving position calculator are present at the image moving positions where the wagon wheel phenomenon occurs, the moving position corrector decides that the seeming moving direction of the animation disagrees with the moving direction determined by the moving position calculator.

4. The animation device according to claim 3, wherein the moving position corrector decides that the seeming moving direction of the animation agrees with the moving direction determined by the moving position calculator when the moving distance of the plurality of images determined by the moving position calculator is less than a predetermined reference distance, even if the moving positions of the plurality of images calculated by the moving position calculator are present at the image moving positions where a wagon wheel phenomenon occurs.

5. The animation device according to claim 2, wherein the moving position corrector, if the seeming moving direction of the animation disagrees with the moving direction determined by the moving position calculator, determines from among positions whose seeming moving direction agrees with the moving direction determined by the moving position calculator, the closest positions from the moving positions calculated by the moving position calculator as the moving positions after correction of the plurality of images.

6. The animation device according to claim 2, wherein the moving position corrector, if the seeming moving direction of the animation disagrees with the moving direction determined by the moving position calculator, determines from among positions whose seeming moving direction agrees with the moving direction determined by the moving position calculator and which are present in a predetermined direction, the closest positions from the moving positions calculated by the moving position calculator as the moving positions after correction of the plurality of images.

7. The animation device according to claim 1, further comprising:
a prearranged position determiner to determine, for each frame, prearranged positions which are the arrangement of the plurality of images in the case where the arrangement of the plurality of images displayed in an initial frame of the animation are shifted to the next images in a final frame in the animation, wherein
the moving position corrector compares the prearranged positions of the plurality of images determined for each frame by the prearranged position determiner with the moving positions of the plurality of images calculated for each frame by the moving position calculator, determines for each image composing the animation the closest prearranged position from the moving position of the image, and determines the closest prearranged position as the moving position after correction of the image.

8. An animation method, the method comprising:
accepting a moving operation of an animation in a moving direction by a moving operation acceptor, the animation being composed of a plurality of images movable in the moving direction;
determining a moving distance and the moving direction of the plurality of images composing the animation from the moving operation received, and calculating moving positions of the plurality of images composing the animation from the moving distance and moving direction by a moving position calculator;
determining, based on the calculated moving positions, occurrence of a wagon wheel phenomenon in which a seeming moving direction of the animation disagrees with the determined moving direction;
when the wagon wheel phenomenon is determined to occur, correcting the moving positions of the plurality of images by a moving position corrector in a manner that a seeming moving direction of the animation agrees with the moving direction determined; and
displaying the plurality of images at the moving positions corrected on an image display.

9. An animation device comprising:
a computer processor; and
a memory coupled to the computer processor storing instructions which, when executed by the computer processor, performs a process including,
  accepting a moving operation of an animation in a moving direction, the animation being composed of a plurality of images movable in the moving direction;
  determining a moving distance and the moving direction of the plurality of images composing the animation from the received moving operation, and calculating moving positions of the plurality of images composing the animation from the moving distance and the moving direction;
  determining, based on the calculated moving positions, occurrence of a wagon wheel phenomenon in which a seeming moving direction of the animation disagrees with the determined moving direction;
  when the wagon wheel phenomenon is determined to occur, correct the calculated moving positions of the plurality of images in a manner that the seeming moving direction of the animation agrees with the determined moving direction; and
  causing an image display to display the plurality of images at the corrected moving positions.

* * * * *